(12) United States Patent
Kakino (10) Patent No.: US 8,584,949 B2
(45) Date of Patent: Nov. 19, 2013

(54) CODE READING APPARATUS AND METHOD

(75) Inventor: Tomonari Kakino, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/448,569

(22) Filed: Apr. 17, 2012

(65) Prior Publication Data

US 2012/0292394 A1    Nov. 22, 2012

(30) Foreign Application Priority Data

May 17, 2011 (JP) .................................. 2011-110772
Feb. 23, 2012 (JP) .................................. 2012-038023

(51) Int. Cl.
  *G06K 7/10* (2006.01)
(52) U.S. Cl.
  USPC ............... 235/462.11; 235/462.09; 235/462.1
(58) Field of Classification Search
  USPC ............... 235/462.11, 462.09, 462.1, 462.24, 235/462.41
  See application file for complete search history.

(56) References Cited

U.S. PATENT DOCUMENTS

| 8,130,407 | B2 * | 3/2012 | Nose et al. ................... 358/1.18 |
| 2004/0011872 | A1 * | 1/2004 | Shimizu ................... 235/462.11 |
| 2005/0194445 | A1 * | 9/2005 | Takakura et al. ........... 235/462.1 |
| 2007/0187512 | A1 * | 8/2007 | Yada ....................... 235/462.11 |
| 2009/0242649 | A1 * | 10/2009 | Mizukoshi et al. ........... 235/494 |

FOREIGN PATENT DOCUMENTS

| JP | 2003-248792 | 9/2003 |
| JP | 2004-054871 | 2/2004 |
| JP | 2004-213061 | 7/2004 |
| JP | 2007-328672 | 12/2007 |

OTHER PUBLICATIONS

English Translation of Office Action of Notice of Rejection for Japanese Patent Application No. 2012-038023 Dated Jun. 4, 2013, 6 pgs.

* cited by examiner

*Primary Examiner* — Edwyn Labaze
(74) *Attorney, Agent, or Firm* — Turocy & Watson, LLP (57) ABSTRACT

A code reading apparatus, comprising: an image capturing unit configured to capture the image picked-up by a image pickup unit; a detection unit configured to detect the code contained in the captured image; a decoding unit configured to decode the detected code; and a recognition unit configured to recognize, if the detected code is a two-dimensional code, the model number of the two-dimensional code. The decoding unit decodes the detected two-dimensional code if the model number recognized is a predetermined model number.

7 Claims, 6 Drawing Sheets

CODE READING APPARATUS AND METHOD

CROSS-REFERENCE TO RELATED APPLICATION

The present application contains subject matter related to that disclosed in Japanese Priority Patent Application No. 2011-110772 filed in the Japan Patent Office on May 17, 2011 and Japanese Priority Patent Application No. 2012-038023 filed in the Japan Patent Office on Feb. 23, 2012 the entire contents of which are hereby incorporated by reference.

FIELD

Embodiments described herein relate to a code reading apparatus and method.

BACKGROUND

At present, in a conventional commodity information processing system used in a supermarket or other shops, some checkout system provided with a POS (Point Of Sale) contains a pre-handling system. The pre-handling system is that the portable terminal carried by a store clerk is operated by the store clerk to register a commodity, and a provisional receipt is printed by a printer on which the two-dimensional code of the commodity registered by the portable terminal is printed before an account settlement processing using the POS terminal installed in the checkout region of a shop. In a shop where this pre-handling system is deployed, the customer delivers the provisional receipt issued by the pre-handling system to an operator in a checkout region. The operator reads the two-dimensional code printed on the provisional receipt to a code reading apparatus connected with the scanner of a POS terminal. Then, the POS terminal carries out an account settlement processing based on the two-dimensional code read by the code reading apparatus.

DETAILED DESCRIPTION

According to one embodiment, a code reading apparatus, comprising: an image capturing unit configured to capture the image picked-up by a image pickup unit; a detection unit configured to detect the code contained in the captured image; a decoding unit configured to decode the detected code; and a recognition unit configured to recognize, if the detected code is a two-dimensional code, the model number of the two-dimensional code, wherein the decoding unit decodes the detected two-dimensional code if the model number recognized is a predetermined model number.

According to other embodiment, a method, comprising: capturing the image picked-up by a image pickup unit; detecting the code contained in the captured image; decoding the detected code; and recognizing, if the detected code is a two-dimensional code, the model number of the two-dimensional code, wherein the decoding decodes the detected two-dimensional code if the model number recognized is a predetermined model number.

By taking a checkout system as an example, the code reading apparatus and the program provided herein are described below with reference to accompanying drawings. The checkout system has a POS terminal for registering and calculating the account of the commodities settled in one transaction. The embodiments are described based on an example of the application of the checkout system in a restaurant or supermarket.

Figure 1:
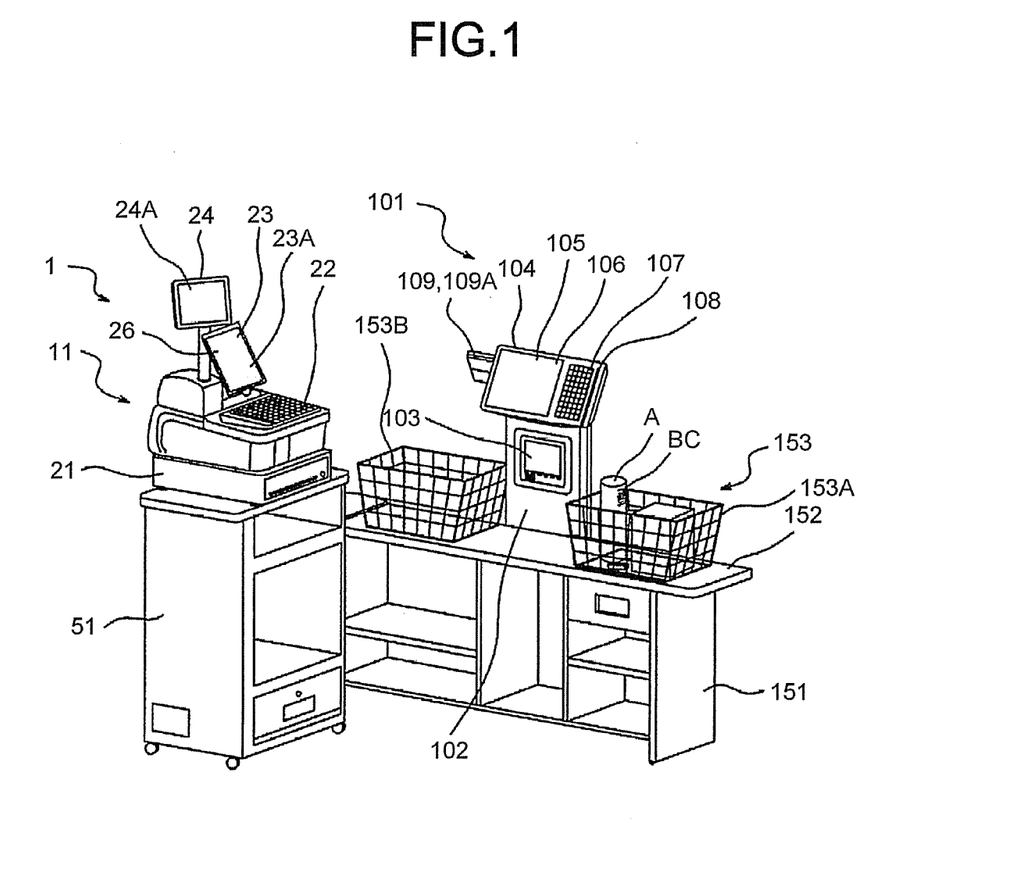
FIG. 1 is a perspective view of a checkout system.

FIG. 1 is a perspective view of a checkout system 1. As shown in FIG. 1, the checkout system 1 has a POS terminal 11 for registering and calculating the account of the commodities settled in a transaction. The POS terminal 11 is configured on a cash drawer 21 on a checkout counter 51. The cash drawer 21 is opened by the POS terminal 11. A keyboard 22 for the operator (user) to press down is configured on the POS terminal 11. Seen from the operator of the keyboard 22, a display 23 is configured more interior than the keyboard 22 to display information for the operator. The display 23 displays information on the display panel 23a thereof. A touch panel 26 indicates hierarchical structure on the display panel 23a. A vertical customer display 24 is rotationally and freely configured at the side further than the display 23. The costumer display 24 displays information on the display panel 24a thereof. Moreover, the display panel 24a of the customer display 24 shown in FIG. 1 faces the nearer side in FIG. 1 and can, however, also face the far side in FIG. 1 by rotating the customer display 24 to enable the customer display 24 to display information for the customer.

An elongate desk-shaped counter 151 is arrange which forms an L shape with the checkout counter 51 provided with the POS terminal 11. A commodity receiving side 152 is formed on the counter 151. A shop basket 153 in which a commodity A added with a barcode BC is contained is hold on the commodity receiving side 152. The shopping basket 153 is classified into a first shopping basket 153a hold by a customer and a second shopping basket 153b spaced from the first shopping basket 153a by a code reading apparatus 101.

The code reading apparatus 101, which is connected with the POS terminal 11 to transmit data with the POS terminal 11 freely, is configured on the commodity receiving side 152 of the counter 151. The code reading apparatus 101 has a thin rectangular housing 102, the front surface of which is provided with a reading window 103. A display operating unit 104 is configured on the upper part of the housing 102 and provided with a display 106 the surface of which indicates hierarchical structure with a touch panel 105. A keyboard 107 is configured on the right of the display 106. The card reading slot 108 of a card reader (not shown) is configured on the right of the keyboard 107. Seen from the operator, a customer display 109 is configured at the left inner side of the back of the display operating unit 104 to provide information for the customer. A customer touch panel 109a indicates hierarchical structure on the display panel of the customer display 109.

A commodity A to be settled in a transaction is accommodated in the first shopping basket 153a hold by the customer. A barcode BC encoded by the commodity code related to the commodity A is adhered on the commodity A. The operator manually moves the commodity A into the second shopping basket 153*b*. The barcode BC faces the reading window 103 of the code reading apparatus 101 during the movement. At this time, an image pickup unit 164 (refer to FIG. 2) configured at the inner side of the reading window 103 pickups the barcode BC. In the code reading apparatus 101, the commodity code of the commodity A is read by detecting and decoding the BC contained in the image picked-up by the image pickup unit 164. The commodity code described as the BC is a code distributed to a commodity to specify the commodity, such as a JAN code consisting of 13 figures.

Moreover, in addition to the BC adhered on the commodity A, the code reading apparatus 101 further reads a discount code adhered on the commodity A and a pre-handling code printed on a provisional receipt (commodity pre-registration voucher) issued by the portable terminal carried by a store clerk in the pre-handling system. The discount code and the pre-handling code may be JAN codes, like the BC, or two-dimensional codes (e.g. QR code (trademark)). Especially, as definitely required to contain the information (e.g. commodity code) representing a registered commodity, the pre-handling code is a two-dimensional code using large storage data. In; this embodiment, the pre-handling code is a QR code ((trademark)) the model number of which is 17-20 and the data size of which is large enough to store the information representing a registered commodity.

For instance, in the pre-handling system, before an account settlement is carried out using the POS terminal 11, the portable terminal carried by a store clerk is operated by the operator to register a commodity, and a commodity pre-registration voucher T (refer to FIG. 7) printed with a two-dimensional code C1 containing the information of the commodity registered in the portable terminal is printed by a printer. In a shop where the pre-handling system is installed, the customer delivers the commodity pre-registration voucher T issued by the pre-handling system to an operator in a checkout region. The operator reads the two-dimensional code C1 printed on the commodity pre-registration voucher T to the code reading apparatus 101 connected with the POS terminal 11. Then, the POS terminal carries out an account settlement based on the two-dimensional code C1 read by the code reading apparatus 101.

Figure 2:
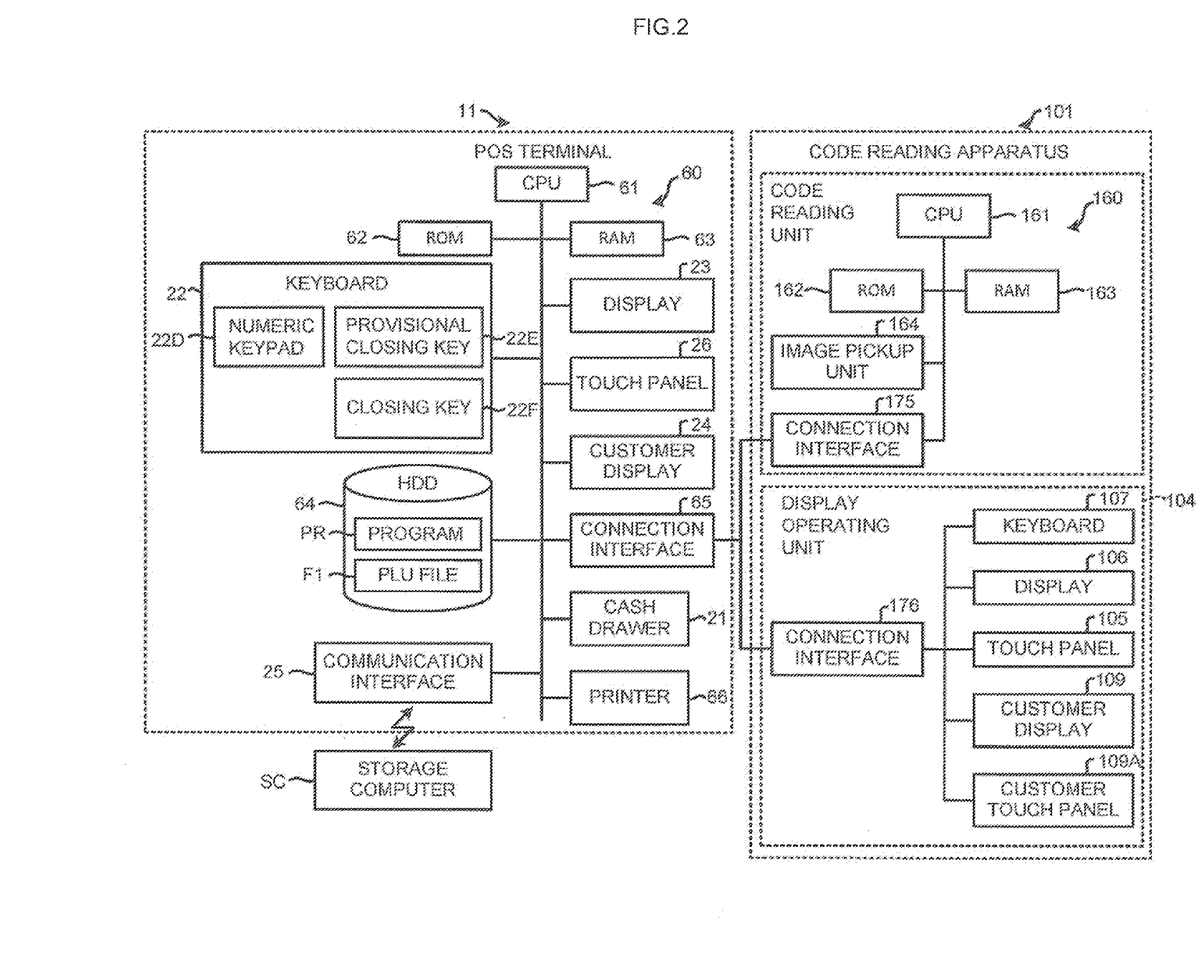
FIG. 2 is a block diagram showing the hardware components of a POS terminal and a code reading apparatus according to an embodiment of the present invention.

FIG. 2 is a block diagram showing the hardware components of the POS terminal 11 and the code reading apparatus 101 according to an embodiment of the present invention. The POS terminal 11 is provided with a micro computer 60 functioning as an information processing unit for carrying out an information processing. The micro computer 60 is formed by connecting a CPU (Central Processing Unit) 61 that carries out various operations and controls each other unit with an ROM (Read Only Memory) 62 and an RAM (Random Access Memory) 63 via a bus line.

The CPU 61 of the POS terminal 11 is connected with the cash drawer 21, the keyboard 22, the display 23, the touch panel 26 and the customer display 24 via various input/output circuits (not shown). The components connected with the CPU 61 of the POS terminal 11 are controlled by the CPU 61.

The keyboard 22 includes a numeric keypad 22*d* the upper surface of which is displayed with figures such as '1', '2', '3' and mathematical operator such as '*', a provisional closing key 22*e* and a closing key 22*f*.

The CPU 61 of the POS terminal 1 is connected with an HDD (Hard Disk Drive) 64, in which programs and files are stored. When run in the POS terminal 11, the programs and files stored in the HDD 64 are completely or partially copied into the RAM 63 to be sequentially executed by the CPU 61.

An example of the program stored in the HDD 64 is a commodity sales data processing program PR. An example of the file stored in the HDD64 is a PLU file F1 that is sent from a storage computer SC and then stored in the HDD64. The PLU file F1 is a file in which commodity-related information such as commodity name, unit price and commodity type is stored corresponding to a commodity code that is uniquely distributed to a commodity.

The CPU 61 of the POS terminal 11 is connected, via an input-output circuit (not shown), with a communication interface 25 that communicates in data with the storage computer SC. The storage computer SC is installed at the backyard of the shop. The PLU file F1 to be sent to the POS terminal 11 is stored in the HDD (not shown) of the storage computer SC.

In addition, the CPU 61 of the POS terminal 11 is connected with a connection interface 65 to transmit data with the code reading apparatus 101. Therefore, the POS terminal 11 is connected with the code reading apparatus 101 via the connection interface 65. Moreover, the CPU 61 of the POS terminal 11 is connected with a printer 66 for printing receipts. The POS terminal 11 prints the content of a transaction on a receipt under the control of the CPU 61.

Like the POS terminal 11, the code reading apparatus 101 also has a micro computer 160, which is formed by connecting a CPU 161 with an ROM 162 and an RAM 163 via a bus line. The programs executed by the CPU 161 are stored in the ROM 162. The CPU 161 is connected with a image pickup unit 164 via various input/output circuits (not shown). The actions of the image pickup unit 164 are controlled by the CPU 161. The display operating unit 104 is connected with the POS terminal 11 via a connection interface 176. The actions of the display operating unit 104 are controlled by the CPU 161 of the POS terminal 11.

The image pickup unit 164 is a CCD image sensor or a CONS image sensor which carries out a image pickup at the reading window 103 under the control of the CPU 161. For instance, the image pickup unit 164 pickups dynamic images at 30 fps. The frame images sequentially picked-up by the image pickup unit 164 at a predetermined frame rate are stored in the RAM 163.

Further, the CPU 161 is connected with a connection interface 175 which is connected with the connection interface 65 of the POS terminal 11 to transmit data with the POS terminal 11. The commodity code that is read from the image picked-up by the image pickup unit 164 of the code reading apparatus 101 and then decoded is output through the connection interface 175 under the control of the CPU 161 and then input to the POS terminal 11 via the connection interface 65.

Figure 3:
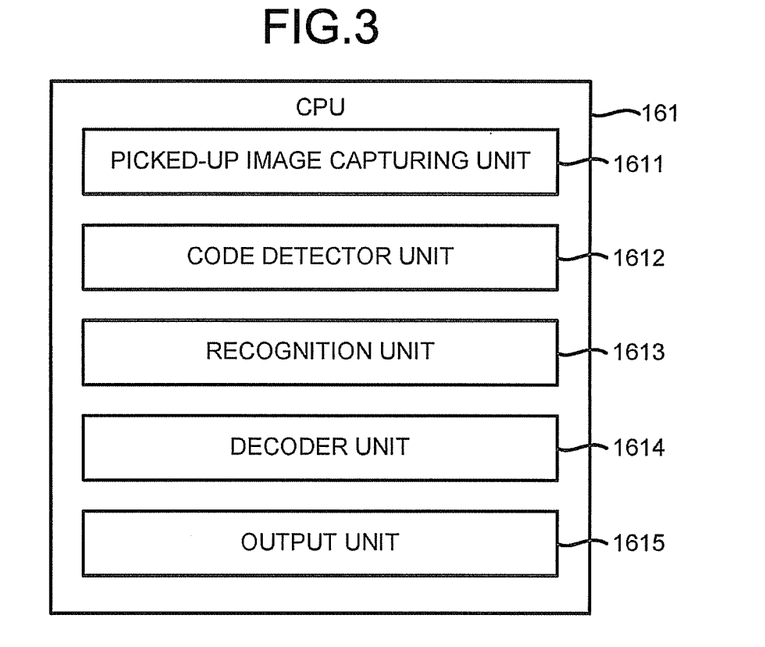
FIG. 3 is a block diagram showing the functional components of the CPU of a code reading apparatus according to an embodiment of the present invention.

The functional units of the code reading apparatus 101 achieved by the sequential program running of the CPU 161 are described below with reference to FIG. 3. FIG. 3 is a block diagram showing the functional components of the CPU 161 of the code reading apparatus 101 according to an embodiment of the present invention. As shown in FIG. 3, by executing programs sequentially, the CPU 161 functions as a picked-up image capturing unit 1611, a code detector unit 1612, a recognition unit 1613, a decoder unit 1614 and an output unit 1615.

The picked-up image capturing unit 1611 sequentially captures the frame images that are stored in the RAM 163 after picked-up by the image pickup unit 164. The picked-up image capturing unit 1611 captures the frame images in accordance with the storage order of the images in the RAM 163. The code detector unit 1612 detects the codes (the barcode BC adhered on the commodity A as well as a discount code and a frontier checker code) contained in the frame image captured by the picked-up image capturing unit 1611. Specifically, a barcode BC is detected from the captured frame image using a pattern matching technology, while a two-dimensional code is detected using a predetermined finder pattern (refer to FIG. 4).

When a two-dimensional code is detected by the code detector unit 1612 using a predetermined finder pattern, the recognition unit 1613 recognizes the model number of the two-dimensional code based on the shape of the detected two-dimensional code. The recognition unit 1613 carries out the recognition before the two-dimensional code detected by the code detector 1612 is decoded by the decoder unit 1614. The model numbers (versions) of two-dimensional codes such as QR codes (trademark) include version 1 (21*21 cells) to version 40 (177*177 cells), every 4 cells defining a different version, therefore, the model number of a two-dimensional code can be recognized based on the shape or size of the two-dimensional code.

Figure 4:
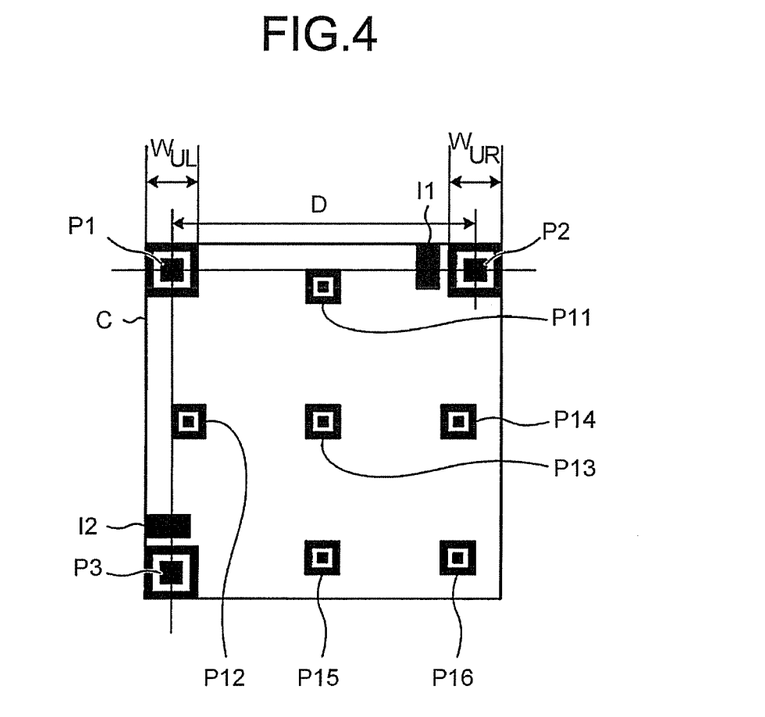
FIG. 4 is a conceptual diagram showing a finder pattern and an alignment pattern in an exemplary two-dimensional code.

The model number recognition of a two-dimensional code based on the shape of the two-dimensional code is described here in detail. FIG. 4 is a conceptual diagram showing a finder pattern P1 and an alignment pattern P11 in an exemplary two-dimensional code C. As shown in FIG. 4, the position detection patterns contained in the two-dimensional code C for the position detection of the two-dimensional code C include finder patterns P1-P3 for detecting the two-dimensional code C and alignment patterns P11-P16 for a position alignment during the decoding of the detected two-dimensional code C. The finder patterns P1-P3 are located at three corners of the two-dimensional code C. The finder pattern P1 having a width of WUL is a distance D away from the finder pattern P2 having a width of WUR.

The recognition unit 1613 calculates the distance D, the widths WUL and WUR between the finder patterns P1 and P2 along a pixel line which extends across the maximum width of the finder patterns P1 and P2 and through the central part of the finder patterns P1 and P2, according to the frame image that the two-dimensional code C is detected. Then, the recognition unit 1613 calculates the dimension X of the two-dimensional code C according to the following formula: X=(WUL+WUR)/14. Sequentially, the recognition unit 1613 temporarily calculates, based on the calculated dimension X, the model number V of the two-dimensional code C according to the following formula:

$$V=[(D/X)-10]/4.$$

If the temporarily calculated model number V is below 6, the recognition unit 1613 takes the temporarily calculated model number V as a recognized model number. If the temporarily calculated model number V is above 7, the recognition unit 1613 calculates the modular size CP of the two-dimensional code C by dividing the width WUR of the right upper finder pattern P2 by 7, that is, CP=WUR/7. Then, the recognition unit 1613 sets the sampling grid of a recognition information area I1 based on the central coordinate and the modular size CP of the finder pattern P2. The recognition unit 1613 reads the recognition information area I1 based on the set sampling grid and recognizes the model number of the two-dimensional code C based on the model number information contained in the recognition information area I1. Moreover, if a detected error is beyond the error correction capacity of an error correcting symbol applied to the recognition information area I1, finder patterns P1 and P3, like the finder patterns P1 and P2, are used to read a recognition information area I2, and the model number of the two-dimensional code C is recognized based on the model number information contained in the recognition information area I2. In this way, the recognition unit 1613 can recognize the model number of the two-dimensional code C accurately based on the widths of finder patterns P1-P3 and the distance between each of the finder patterns P1-P3. Moreover, the recognition of the model number using finder patterns P1-P3 is merely an example, and the same recognition can be certainly realized according to the position relationship between alignment patterns P11-P16.

The decoder unit 1614 decodes the codes (barcode BC, two-dimensional code C) detected by the code detector unit 1612 according to the predetermined processing (for example, JAN code or QR code (a registered trademark)). In the case where a two-dimensional code C is detected by the code detector unit 1612 and the model number recognized by the recognition unit 1613 is preset in the ROM 162, the decoder unit 1614 decodes the detected two-dimensional code C. More specifically, the decoder unit 1614 decodes the detected two-dimensional code C if the recognized model number is a model number used as a pre-handling code. The output unit 1615 outputs the code decoded by the decoder unit 1614 to the POS terminal 11 via the connection interface 175.

In this way, in the code reading apparatus 101, the detected two-dimensional code C is recognized by the recognition unit 1613 before decoded by the decoder unit 1614, and the decoder unit 1614 decodes the detected two-dimensional code C if the recognized model number is a predetermined model number such as a pre-handling code. Thus, in the code reading apparatus 101, the two-dimensional code of a pre-handling system can be recognized quickly to prevent other two-dimensional codes from being decoded to shorten processing time.

Figure 5:
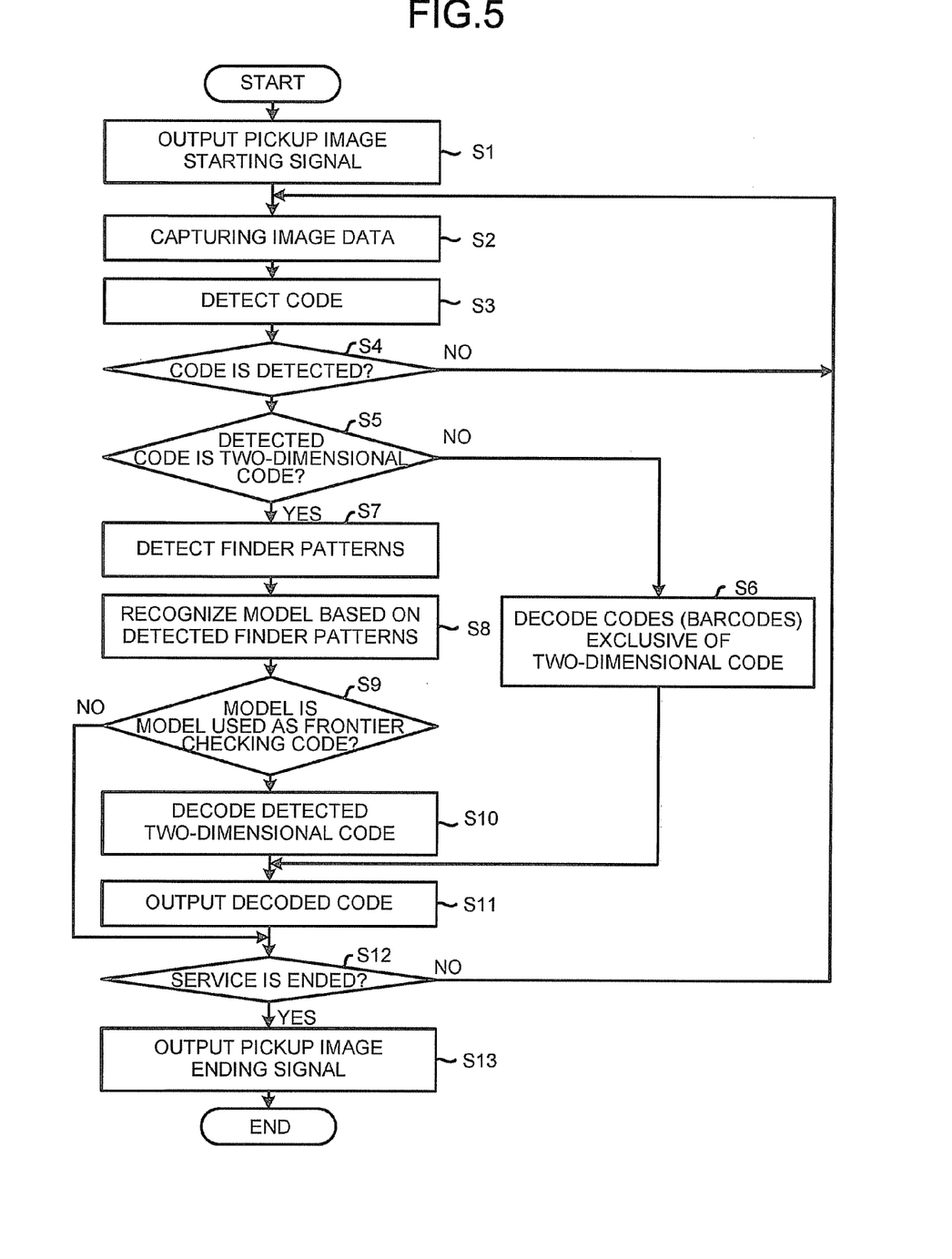
FIG. 5 is a flow chart showing an example of the actions carried out by a code reading apparatus according to an embodiment of the present invention.

The actions of the code reading apparatus 101 are described below in detail. FIG. 5 is a flow chart showing an example of the actions carried out by the code reading apparatus 101 according to an embodiment of the present invention.

As shown in FIG. 5, the image pickup unit 164 outputs a image pickup starting signal corresponding to the starting of the commodity registration of the POS terminal 11 to start the image pickup of the image pickup unit 164 (S1). Next, the picked-up image capturing unit 1611 sequentially captures the frame images that are stored in the RAM 163 after picked-up by the image pickup unit 164 (S2). Then, the code detector unit 1612 detects the codes contained in the frame images captured by the picked-up image capturing unit 1611 (S3).

Sequentially, the code detector unit 1612 determines whether or not a code is detected in Act S3 (S4). If no code is detected in Act S3 (S4: No), the flow returns to Act S2 to process the next frame image. If there is a code detected in Act S3 (S4: Yes), the code detector unit 1612 determines whether or not the detected code is a two-dimensional code C containing finder patterns P1-P3 (S5). If the detected code is not a two-dimensional code C (S5: No), the decoder unit 1614 extracts the codes contained in the frame images and decodes the codes (e.g. JAN codes) exclusive of two-dimensional code.

Figure 6:
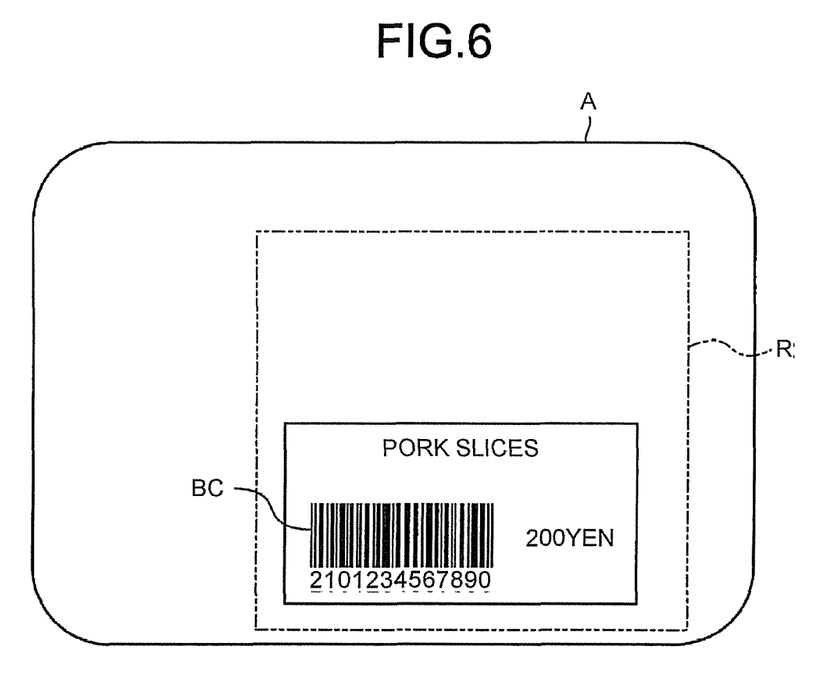
FIG. 6 is a diagram showing an example of the relationship between the image pickup area of a image pickup unit and a commodity.

FIG. 6 shows an example of the relationship between the reading area R of the image pickup unit 16 and a commodity A. The area surrounded by the dotted lines in FIG. 6 is an area in which the image pickup unit 164 can pickup a frame of image at a time, that is, a reading area R. Moreover, a barcode BC is adhered on the commodity A. As shown in FIG. 6, the commodity A is placed by the operator to face the image pickup unit 164 so that the barcode BC can enter into the reading area R, the barcode BC contained in the frame image detected in Act S3 is decoded in Act S6.

If the detected code is a two-dimensional code C (S5: Yes), the recognition unit 1613 detects finder patterns P1-P3 from the frame image (S7) and recognizes the model number of the two-dimensional code C according to the shape of the two-dimensional code C resulting from the detected finder patterns P1-P3 (S8). Then, the decoder unit 1614 determines whether or not the model number recognized by the recognition unit 1613 is a preset predetermined model number, for example, a model number used as a pre-handling code (Act S9).

If the model number recognized by the recognition unit 1613 is not a model number used as a pre-handling code (S9: No), the decoder unit 1614 proceeds to execute Act S12, instead of decoding the detected two-dimensional code C. If the model number recognized by the recognition unit 1613 is a model number used as a pre-handling code (S9: Yes), the decoder unit 1614 decodes the detected two-dimensional code C (S10) and then proceeds to execute Act S11.

Figure 7:
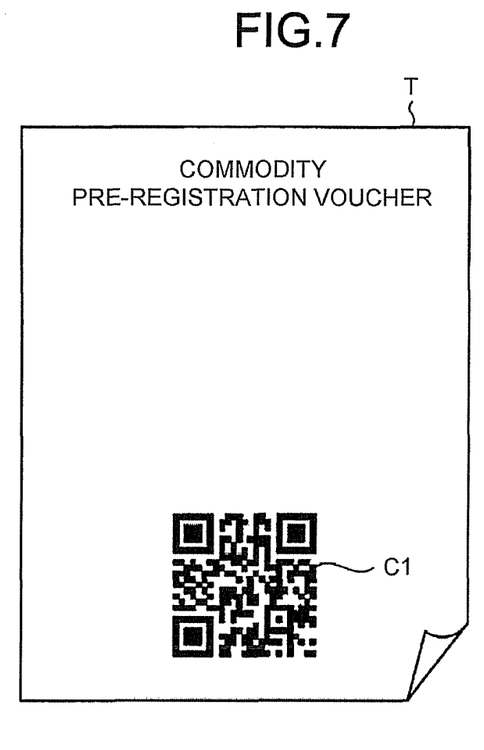
FIG. 7 is a diagram showing an example of a commodity pre-registration voucher.

FIG. 7 is a diagram showing an example of a commodity pre-registration voucher T. As shown in FIG. 7, the two-dimensional code C1 of the commodity pre-registered in a pre-handling system is printed on a commodity pre-registration voucher T. The two-dimensional code C1 on the commodity pre-registration voucher T needs a data size that is big enough to store the information representing a registered commodity and therefore has a predetermined model number such as versions 17-20. Thus, the commodity pre-registration voucher T is placed by the operator to face the image pickup unit 164 so that the two-dimensional code C1 enters into the reading area R, the two-dimensional code C contained in the frame image is detected in Act S3, and the model number of the two-dimensional code C is recognized in Act S8. Moreover, the decoding processing of Act S10 is carried out if the model number is the model number used in the pre-handling system.

The output unit 1615 outputs the code decoded in Act S6 or S10 to the POS terminal 11 (S11). Then, the CPU 161 determines whether or not a service ending indicator indicative of the ending of a commodity registration is received from the POS terminal 11 (Act S12). If the service continues (S12: No), the CPU 61 returns to execute Act S2 to continue to process the next frame image. If the service is ended (S12: Yes), the CPU 161 outputs a image pickup ending signal to the image pickup unit 164 to end the image pickup of the image pickup unit 164 and then ends the processing.

Further, the program executed by the code reading apparatus 101 in this embodiment is provided by being compiled in an ROM but can also be provided by being stored in a computer-readable recording medium such as CD-ROM, FD (floppy drive), CD-R, DVD (digital versatile disk) as an installable or executable file, or being stored in a computer connected with a network such as the Internet to be provided through a network download, or provided or published by a network such as the Internet.

The program executed by the code reading apparatus 101 consists of modules including each of the foregoing units (the picked-up image capturing unit 1611, the code detector unit 1612, the recognition unit 1613, the decoder unit 1614 and the output unit 1615), however, as an actual piece of hardware, a CPU reads the program from the ROM and then executes the program to load each of the foregoing units to a main memory to generate each of the above-mentioned units on the main memory.

Moreover, in the exemplary embodiment, a code is detected at the side of the code reading apparatus 101 according to the image picked-up by the image pickup unit 164, and then decoded and output to the POS terminal 11. However, the code detection carried out according to the image picked-up by the image pickup unit 164 and the decoding on the detected code may also be carried out at the side of the POS terminal 11. Specifically, by executing programs, the CPU 161 achieves the functions of the picked-up image capturing unit 1611, the code detector unit 1612, the recognition unit 1613, the decoder unit 1614 and the output unit 1615 at the side of the POS terminal 11.

Moreover, in this exemplary embodiment, the two-dimensional code detected by the code detector 1612 is recognized by the recognition unit 1613 before decoded by the decoder unit 1614. However, the recognition unit 1613 can carry out the recognition before or while the decoder unit 1614 carries out a decoding. In the case where the recognition of the recognition unit 1613 and the decoding of the decoder unit 1614 are synchronously carried out and the model number recognized by the recognition unit 1613 is the model number used in the pre-handling system, the decoder unit 1614 continues the decoding processing to decode the two-dimensional code. Moreover, the decoding of the decoder unit 1614 is ended and no two-dimensional code is decoded if the model number recognized by the recognition unit 1613 is not the model number used in the pre-handling system. As a result, the decoding of the decoder unit 1614 is interrupted if the model number recognized is not the model number used in the pre-handling system to relieve load. Besides, the two-dimensional code can be decoded more quickly as the recognition of the recognition unit 1613 and the decoding of the decoder unit 1614 are synchronously carried out.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A code reading apparatus, comprising:
    an image capturing unit configured to capture the image picked-up by a image pickup unit;
    a detection unit configured to detect the code contained in the captured image;
    a decoding unit configured to decode the detected code;
    a recognition unit configured to recognize, if the detected code is a two-dimensional code, a model number of the two-dimensional code;
    a memory unit configured to store therein a predetermined model number; and
    a determination unit configured to compare the recognized model number with the predetermined model number to determine whether the recognized model number is identical to the predetermined model number,
    wherein the decoding unit decodes the detected two-dimensional code if the determination unit determines that the model number recognized is identical to the predetermined model number, and does not decode the detected two-dimensional code if the determination unit does not determine that the model number recognized is identical to the predetermined model number.

2. The code reading apparatus according to claim 1, wherein
    the detection unit detects the position detection patterns contained in the two-dimensional code; and
    the recognition unit recognizes the model number of the two-dimensional code according to the widths of the detected position detection patterns and the distance between each of the position detection patterns.

3. The code reading apparatus according to claim 1, wherein
the code detected by the detection unit is at least one of a barcode and the two-dimensional code.

4. The code reading apparatus according to claim 1, wherein
the memory is configured to store therein a plurality of the predetermined model numbers, and
the determination unit is configured to compare the recognized model number with the predetermined model numbers to determine whether the recognized model number is identical to any one of the predetermined model numbers, and
wherein the decoding unit decodes the detected two-dimensional code if the determination unit determines that the model number recognized is identical to any one of the predetermined model numbers, and does not decode the detected two-dimensional code if the determination unit does not determine that the model number recognized is identical to any one of the predetermined model numbers.

5. A method, comprising:
capturing the image picked-up by a image pickup unit;
detecting the code contained in the captured image;
decoding the detected code;
recognizing, if the detected code is a two-dimensional code, a model number of the two-dimensional code,
storing a predetermined model number in a memory unit; and
comparing the recognized model number with the predetermined model number to determine whether the recognized model number is identical to the predetermined model number
wherein the decoding decodes the detected two-dimensional code based on determining that the model number recognized is identical to the predetermined model number, and not decoding the detected two-dimensional code in response to determining that the model number recognized is not identical to the predetermined model number.

6. The method according to claim 5, wherein
the detecting detects the position detection patterns contained in the two-dimensional code; and
the recognizing recognizes the model number of the two-dimensional code according to the widths of the detected position detection patterns and the distance between each of the position detection patterns.

7. The method according to claim 5, wherein
the code detected by the detecting is at least one of a barcode and a two-dimensional code.

* * * * *